United States Patent [19]

Desio et al.

[11] Patent Number: 5,436,294
[45] Date of Patent: Jul. 25, 1995

[54] POLYPHTHALAMIDE BLENDS

[75] Inventors: Glenn P. Desio, Roswell, Ga.; Ruth A. Montag; George A. Corbin, both of Naperville, Ill.

[73] Assignee: Amoco Corporation, Chicago, Ill.

[21] Appl. No.: 205,317

[22] Filed: Mar. 3, 1994

Related U.S. Application Data

[63] Continuation-in-part of Ser. No. 889,814, May 29, 1992, Pat. No. 5,292,805, and Ser. No. 21,303, Feb. 23, 1993, abandoned, which is a continuation-in-part of Ser. No. 585,879, Sep. 20, 1990, abandoned.

[51] Int. Cl.$^6$ .............................................. C08L 77/10
[52] U.S. Cl. ..................... 525/66; 525/179; 525/184
[58] Field of Search ........................ 525/66, 179, 184

[56] References Cited

U.S. PATENT DOCUMENTS

| | | | |
|---|---|---|---|
| 4,603,166 | 7/1986 | Poppe | 524/606 |
| 4,795,782 | 1/1989 | Lutz | 525/66 |
| 5,006,601 | 4/1991 | Lutz | 525/66 |
| 5,122,570 | 6/1992 | Subramanian | 525/66 |
| 5,212,238 | 5/1993 | Scheibelhoffer | 525/66 |

*Primary Examiner*—James J. Seidleck
*Assistant Examiner*—I. Zemel
*Attorney, Agent, or Firm*—Richard J. Schlott; Stephen L. Hensley

[57] ABSTRACT

Impact-modified polyphthalamide resins are improved in ductility and rigidity when blended with polypropylene and a carboxylated polyolefin resin. The blends exhibit an excellent balance of ductility and rigidity.

10 Claims, No Drawings

POLYPHTHALAMIDE BLENDS

CROSS-REFERENCE TO RELATED APPLICATIONS

This application is a Continuation-in-Part of U.S. application Ser. No. 07/889,814, now U.S. Pat. No. 5,292,805 filed May 29, 1992 and U.S. application Ser. No. 08/021,303, filed Feb. 23, 1993, now abandoned which was a Continuation-in-Part of U.S. application Ser. No. 07/585,879, filed Sep. 20, 1990, now abandoned.

BACKGROUND OF THE INVENTION

This invention relates to blends comprising a polyphthalamide, preferably a crystallizable or crystalline polyphthalamide, and more particularly to blends comprising polyphthalamide, a functionalized rubbery modifier, a functionalized polyolefin and polyolefin having improved tensile properties and rigidity together with good ductility, and to a method for improving the ductility of polyphthalamides.

The highly desirable balance of strength, stiffness and thermal properties of polyamides has gained these resins wide acceptance in the molding arts and in the extrusion arts including fiber spinning and film extrusion. The resins are found in a great variety of applications, and may be particularly attractive for use where resistance to chemical and thermal attack is required. Crystalline polyamides comprising aliphatic terephthalamide units exhibit particularly good thermal, strength and stiffness properties, and low water absorption relative to nylon 6,6. Crystalline and crystallizable polyphthalamide resins are known in the art, and a variety of grades are readily available from commercial sources, including for example the Amodel® Polyphthalamides from Amoco Performance Products, Inc. Such resins have relatively high melting points, generally about 290° C. or higher, and the temperature of onset of thermal degradation for many does not greatly exceed their melting points, making the thermal processing of these resins a more rigorous and complex task, particularly for filled and reinforced polyphthalamides, than is encountered for lower melting polyamides including nylon 6,6 melting at about 260°–265° C.

Polyphthalamides are typically low in ductility as reflected by generally low values for elongation at break and the lack of significant extensibility in tensile testing. In a dry, as-molded condition, such resins also may be deficient in impact properties as measured by mechanical tests such as the Notched Izod Impact Test or the high speed instrumented Dart impact Test. Articles molded from such highly rigid, low ductility resins may be subject to cracking, and to brittle failure in stress. Where it is expected that a molded part will be subjected to repeated flexings, or where the part is required to be rigid and to exhibit a spring-like behavior when flexed, lack of a reasonable level of ductility may lead to premature failure of the part.

Considerable effort has been made over the years to improve mechanical properties of polyamides. Plasticizing additives are available to improve the flow and ductility of nylons, and a variety of polymeric additives, generally rubbery compositions that can be blended or incorporated into the polyamides, have been developed for improving ductility and impact strength. Of course, it is important that such improvements be achieved without substantial adverse effects on particular properties of the polyamide needed for use in the intended application. It also is important that the additives retain their effectiveness after processing of polyamide compositions containing the same and during use of articles prepared therefrom.

A number of additives are known for use in improving the impact strength of aliphatic nylons and their melt processability. Generally, the additives are rubbery compositions that can be blended or incorporated into the polyamides to provide improvement in impact strength. For example, the use of from about 10–50 wt. % of a pendant succinic anhydride group-containing reaction product of maleic anhydride with a hydrogenated polymer of a conjugated diene or hydrogenated random or block copolymer of a conjugated diene and a vinyl aromatic hydrocarbon with a variety of polyamides is disclosed in U.S. Pat. Nos. 4,427,828, issued Jan. 24, 1984, and 4,508,874, issued Apr. 2, 1985, both to Hergenrother et al. Impact resistant blends of a polyamide and a thermally stable, modified, selectively hydrogenated, block copolymer of a conjugated diene and a vinyl aromatic compound are disclosed in U.S. Pat. No. 4,783,503, issued Nov. 8, 1988, to Gergen et al. Olefin copolymers containing acid groups are disclosed for use with polyamides in British Patent Specification 998,439 to E. I. dupont de Nemours and Company, and U.S. Pat. No. 4,174,358 to Epstein, issued Nov. 13, 1979, discloses polyamides having a polymer dispersed therein as discrete particles 0.01 to 1 micron in size, the dispersed polymer having sites that adhere to the polyamide.

Rubbery modifiers may also be used in filled polyamides. U.S. Pat. No. 4,537,929 to Nangrani, issued Aug. 27, 1985, discloses maleated ethylene copolymer impact modifiers for use in producing high impact neat resin compositions comprising an aliphatic nylon. The impact modifiers are shown to be less effective in improving the impact of glass fiber-reinforced formulations. U.S. Pat. No. 4,659,752 to Piret, issued Apr. 21, 1987, further describes the difficulty of improving the impact properties of glass reinforced thermoplastics. According to patentee, the level of rubber needed to impart a significant improvement in the impact properties of filled resins has a marked detrimental effect on other mechanical properties.

Combinations of impact modifiers have also been employed. For example, in U.S. Pat. No. 4,849,471 to Saito et al., issued Jul. 18, 1989, patentees employed a mixture of hydrogenated block copolymers and functionalized ethylene-containing polymers in a variety of neat polyamide compositions including a 50/50 copolymer of hexamethylene polyterephthalamide and hexamethylene polyisophthalamide. U.S. Pat. No. 5,122,569 to Scheibelhoffer et al., describes the use of peroxide-coupled combinations of elastomers and functionalized polymers as modifiers for polyamides. U.S. Pat. No. 4,795,782 to Lutz et al., issued Jan. 3, 1989, discloses the use of hydrogenated block copolymers, functionalized hydrogenated block copolymers, polypropylene and functionalized polypropylene in various combinations as modifiers for aliphatic nylons.

Although the modifiers described in the prior art are effective in improving impact when used with aliphatic nylons, generally a high level of modifier, often as much as 20 wt % or more, is needed in order to attain desirably high impact properties. The presence of rubbery modifiers at these high levels has a marked effect on other important mechanical properties, generally reducing the rigidity of impact modified aliphatic nylon blends as reflected in the modulus of the resin formulation, as well as tensile properties.

The high level of rigidity and good tensile strength characteristics of polyphthalamides are very important to many applications. Overcoming the low ductility of high temperature polyphthalamides while maintaining the rigidity to a high degree, even at elevated temperatures, would widen the commercial utility of these polyphthalamides. The prior art rubbery modifiers conventionally employed in compounding high impact aliphatic nylons markedly reduce rigidity and strength properties when used at levels needed to achieve significant impact improvement. Similar reductions in rigidity for polyphthalamides would reduce their attractiveness for many applications. Modifiers capable of improving the ductility and particularly the impact characteristics of molded polyphthalamide articles and extruded goods when used at low concentration levels and, further, capable of retaining good ductility over a wide range of temperatures, would give compounders and resin formulators greater flexibility in tailoring the property balance of polyphthalamide blends to minimize the loss in rigidity and tensile properties and provide materials to suit a wider variety of applications.

BRIEF SUMMARY OF THE INVENTION

Blends comprising a crystallizable polyamide having recurring aliphatic diamine terephthalamide units, together with a functionalized block copolymer impact modifier are improved in rigidity when further blended with polyolefin, optionally including a functionalized polyolefin. The blends have excellent strength and ductility properties and good surface appearance and are surprisingly high in rigidity. These resin formulations are moldable and extrudable, and are particularly useful in providing molded and extruded articles, laminates and composites highly desirable in applications where exposure to demanding environments is contemplated.

DETAILED DESCRIPTION

The improved compositions of this invention are blends comprising a polyphthalamide, a functionalized rubbery impact modifier and a crystalline polypropylene., and may further include a carboxyl-modified polypropylene. Briefly, in the invented blends, the polyolefin components form a discontinuous phase or phases within a matrix or continuous phase comprising the polyphthalamide component. Such compositions can be prepared by combining and thermally processing the polyphthalamide and the polyolefin components and may be useful for producing thermally-fabricated articles, such as injection-molded or extruded automotive under-the-hood parts and the like intended for use in applications requiring a high degree of toughness, strength and thermal resistance.

In greater de,tail, the polyphthalamide component of the invented compositions is a crystallizable polyamide comprising at least about 40 mole percent recurring aliphatic diamine terephthalamide units which may be further described as represented by the formula

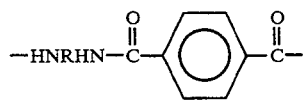

wherein R comprises at least one aliphatic hydrocarbyl radical. The polyphthalamide component generally has a molecular weight of at least about 5,000 and preferably is amine-terminated to facilitate incorporation of the modifying component into the polyphthalamide component. However, acid-terminated polyphthalamide components also are suitable because preparation of the invented compositions typically results in minor, though adequate, cleavage of carbonamide linkages and, in turn, generation of reactive amine end groups, to ensure suitable incorporation of the modifier component into the polyphthalamide component.

Preferably, aliphatic radicals R in the above formula comprise at least one straight chain, branched or cyclic, substituted or unsubstituted aliphatic radical having from about 4 to about 14 carbon atoms. These radicals are preferred because polyphthalamides comprising the same exhibit good crystallinity and desirable high temperature properties, together with melting and thermal degradation temperatures making them well suited for melt processing with the modifying components of the invented compositions. Specific examples of suitable aliphatic radicals include tetramethylene, hexamethylene, dodecamethylene and the like, as well as their alkyl-substituted analogs such as 2-methylpentamethylene, 2,4-dimethylhexamethylene and the like, and cyclic analogs such as p-cyclohexyl and the like. Most preferably, R in the formula comprises a hexamethylene radical, either alone or as mixture with additional aliphatic 4 to 14 carbon atom radicals.

The polyphthalamide component of the invented compositions also can comprise a portion of recurring units as described above but wherein radicals R are replaced with one or more other types of divalent hydrocarbyl radicals such as substituted or unsubstituted aromatic radicals. Specific examples of such other radicals include m-phenylene, p-phenylene, m-xylylene, p-xylylene, oxybis-phenylene and methylenebis-phenylene. When such other radicals are present, the proportion thereof should not be so great as to adversely affect desirable properties of the polyphthalarnide component, such as strength, thermal properties and melt processability. Preferably, not greater than about 30 mole percent of the recurring units of the polyphthalamide comprises such other radicals.

The polyphthalamide may further comprise, in addition to the terephthalamide units represented by the formula above, one or more other carbonamide units including aliphatic diamide units such as, for example, hexamethylene adipamide, hexamethylene sebacamide, hexamethylene azeleamide, hexamethylene dodecamethylamide, hexamethylene cyclohexanedicarboxamide, dodecamethylene adipamide, and units derived from lactams such as caprolactam; aromatic diamide units such as m-xylylene isophthalamide, p-xylylene isophthalamide, oxybisphenylene isophthalamide or the like; and aliphatic-aromatic diamide units such as, for example, hexamethylene isophthalamide, hexamethylene 2,6-naphthalene dicarboxamide, m-xylylene adipamide, heptamethylene isophthalamide, dodecamethylene isophthalamide, m-phenylene adipamide or the like.

Preferred among such additional carbonamide units are hexamethylene adipamide, hexamethylene isophthalamide and caprolactam units and combinations thereof.

Proportions of such other carbonamide units in the polyphthalamide compositions should not be such as to adversely affect processability or desirable properties of the invented compositions. The proportion of the other carbonamide units will affect melting point and glass transition temperature characteristics of the resulting copolymers, and affect heat distortion temperature characteristics, particularly for resin specimens that: have been moisture-conditioned, that is, exposed to moist or humid conditions. As is well known, crystallizable copolymers comprising terephthalamide 0 and adipamide, units are generally crystallizable in all proportions and have high melting points. However, the glass transition temperature values for the copolymers are greatly affected by the level of the adipamide units. For copolymers and terpolymers comprising terephthalamide and isophthalamide units, the melt temperature, and the crystallizability, is greatly affected by the level of the isophthalamide component while the glass transition temperature values for these copolymers will be less affected. The effect of still other carbonamide units on these properties is also known, or may be readily determined. The resin formulator is thus able to tailor the thermal properties of the polyamide resin to have a desired combination of glass transition temperature and melting point by selecting an appropriate combination of terephthalamide units and other carbonamide units.

The preferred polyphthalamide component for most applications will have a crystal melting point of at least about 270° C., more preferably from about 290° C. to about 330° C., because the same exhibit particularly desirable thermal properties and are more easily processed than still higher melting polyphthalamides. In addition, the preferred polyphthalamides will have glass transition temperatures ("$T_g$s") above about 75° C., preferably in the range of from about 80 to about 130° C.

Generally, at least about 40 mole percent of the carbonamide moieties of the polyamide composition is provided by aliphatic diamine terephthalamide units corresponding to the formula above to assure crystallinity and desirable strength and thermal properties. More preferably, about 45 to about 90 mole % of such moieties are provided by such units to achieve good properties and ensure melt processing compatibility of the polyphthalamide component and the modifying component. Less crystalline, lower melting temperature polyphthalamides comprising lower levels of terephthalamide units, as well as copolyphthalamides that are not crystallizable because of the presence of a high level of one or more additional carbonomide units that interfere with crystallization and thus lack a detectable crystalline melt temperature, may also provide useful blends with attractive strength properties when compounded according to the teachings of this invention. However, such blends will generally be deficient in thermal properties important for many applications and thus will be less preferred.

A preferred polyphthalamide component of the invented compositions comprises a semicrystalline polyphthalamide of fast or intermediate crystallization rate having a Tg above about 75° C. and a Tm above about 290° C. comprising recurring units corresponding to formulas A, B and C below in proportions of about 40 to about 95 mole percent A, 0 to about 35 mole percent B and about 5 to about 60 mole percent C.

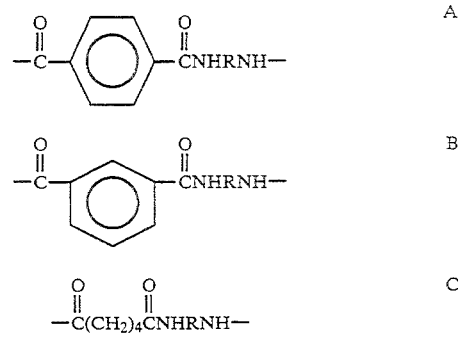

In the above formulas, R is as described hereinabove, with hexamethylene being most preferred. Also as described above, R may represent a mixture of aliphatic 4 to 14 carbon radicals.

Particularly preferred among such polyphthalamides are those wherein the mole ratio of the units A, B and C ranges from about 50–95:25–0:50–5 with melting points of about 300 to about 350° C., $T_g$s of about 80 to about 130° C. and inherent viscosities generally ranging from about 0.75 to about 1.4 dl/g, with about 0.9 to about 1.25 dl/g being preferred from the standpoint of properties of molded parts and ease of molding. Such polyphthalamides are disclosed in detail in commonly assigned U.S. Pat. No. 4,603,166 to Poppe et al., issued Jul. 29, 1986, now U.S. Pat. No. Re. 34,447 which is incorporated herein by reference. Especially preferred among such polyphthalamides are those wherein R in the above formulas comprises hexamethylene. Most preferred among such polyphthalamides are those wherein R in formulas A, B and C consists of hexamethylene and the mole ratio of the A, B and C units is about 65:25:10.

Also disclosed in U.S. Pat. No. Re. 34,447 and suitable as the polyphthalamide component of the invented compositions are polyphthalamides comprising at least two of the units A, B and C shown above, in mole ratios of 65:0:35, 55:10:35, 60:10:30, 50:0:50 and 60:0:40, and wherein R is hexamethylene.

Polyphthalamides comprising recurring units A, B and C, as depicted in the formulas above, in mole ratios of about 50–65:0–15:20–50, also are suitable. A specific example of a polyphthalamide having such a composition, disclosed in Table 10 of published European Patent Application No. 84300744.4 (Publication No. 0121984), published Oct. 17, 1984, is a polyphthalamide of terephthalic acid, isophthalic acid and adipic acid in a mole ratio of 55/15/30 with hexamethylene diamine. Among such polyphthalamides, those wherein the mole ratio of the A, B and C units is greater than 50 but less than 60: greater than 0 to less than 15: at least 25 but less than 50, and especially wherein R comprises hexamethylene, give particularly good results. Mechanical properties, including tensile and flexural strength and modulus, of such polyphthalamides together with their melt processability and low water absorption tendencies and good retention of mechanical properties when wet, make compositions according to this invention comprising such polyphthalamides particularly well suited for fabrication of injection molded articles for use in humid environments. Melting points of such compositions generally range from about 290° to about 320° C.

Another example of a polyphthalamide component of the invented compositions is that prepared from dicarboxylic acid compounds comprising terephthalic acid and isophthalic acid compounds in a mole ratio of 80:20 to about 99:1 and diamines comprising hexamethylene diamine and trimethylhexamethylene diamine in a mole ratio of about 98:2 to about 60:40. Such polyphthalamides are described in detail in commonly assigned U.S. Pat. No. 4,617,342 to Poppe et al., issued Oct. 14, 1986, which is incorporated herein by reference. Such polyphthalamides melt at about 270° to about 345° C.

Also suitable, for use in the invented compositions are polyphthalamides based on terephthalic acid and isophthalic acid compounds in a mole ratio of about 70–99:30–1 and hexamethylene diamine. These polyphthalamides are described in detail in commonly assigned U.S. Pat. No. 4,863,991 issued Sep. 5, 1989 to Poppe et al., which is incorporated herein by reference. Melting points range from about 310° to about 350° C.

Polyphthalamides based on terephthalic acid and other diamines, particularly in mixtures, having the desired melting points are also known and may be useful in the practice of this invention. For example, crystallizable polymers comprising terephthalamides of aliphatic diamines 2-methylpentamethylene diamine, neopentyldiamine trimethylhexamethylene diamine and the like, alone or in combination with another diamine such as hexamethylene diamine, have been described in the, art, and many such polymers have crystal melting points above about 270° C. Still further suitable crystallizable copolyphthalamides may result when additional carbonamide components such as isophthalamide or adipamide units are incorporated into these resin formulations. The polyphthalamide component of the invented compositions can be prepared from appropriate starting materials, e.g., a dicarboxylic acid component comprising terephthalic acid or a derivative thereof and a diamine component comprising at least one aliphatic diamine or a derivative thereof, in suitable proportions by any suitable means. If desired, the acid component can comprise terephthalic acid compound and one or more additional dicarboxylic acids or derivatives thereof to provide copolyamides as described above. Similarly, mixtures of diamines can be used and lactams can be included in the starting materials if desired. An example of a suitable method for preparing the polyphthalamide component is disclosed in the aforementioned U.S. Pat. No. Re. 34,447 and involves a salt preparation step, preferably conducted batchwise to achieve proper stoichiometry, wherein starting materials comprising dicarboxylic acid and diamine components and solvent are added to a suitable reaction vessel in appropriate amounts and maintained under conditions effective to cause salt formation but avoid appreciable conversion of salt to oligomers. Water is a preferred solvent and temperature is preferably maintained below about 120° C. to minimize conversion. Product of the salt preparation step can be introduced into a condensation section operated either batchwise or continuously. In the condensation section substantial conversion of salt to polymer takes place. The condensation product then typically is introduced into a finishing section, such as a twin-screw extruder, to obtain further conversion and increase inherent viscosity from a level of about 0.1 to about 0.6 dl/g typically achieved in the condensation section up to about 0.8 dl/g or greater. The polymeric product can be recovered from the finishing section and, for example, pelletized or mixed with fillers, additives and the like.

Commonly assigned U.S. Pat. Nos. 4,603,193, issued Jul. 29, 1986, and 4,831,108, issued May 16, 1989, both to Richardson et al. and incorporated herein by reference, also disclose preparation of such polyphthalamides by a process particularly suited for high terephthalamide content polyamides. The process of the latter comprises forming an essentially homogeneous mixture of polyamide-forming starting materials, transferring the mixture to a heated preflash zone under pressure, passing the heated, pressurized mixture through an orifice into a zone of lower pressure and high heat flux to form an aerosol mist of reactants, passing the aerosol mist through the zone of high heat flux at short residence time and passing the resulting product to a finishing reactor to increase conversion thereof.

Copolyamides comprising recurring terephthalamide units together with one or more other types of recurring carbonamide units also can be prepared by blending appropriate homopolyamides or copolyamides in suitable amounts. For example, melt compounding a hexamethylene terephthalamide/hexamethylene isophthalamide copolyamide with nylon 66 can yield a hexamethylene terephthalamide/isophthalamide/adipamide terpolyamide. Melt compounding at temperatures above the melting point of the highest melting component in a suitable extruder is preferably employed in such preparation.

The functionalized rubbery impact modifier of the invented compositions may be a functionalized block copolymer, for example, a maleic anhydride-modified block copolymer comprising polymerized styrene blocks and olefinic rubber blocks wherein the polymerized styrene content preferably is about 5 to about 50 weight percent and provides desirable improvements in toughness in the invented compositions. Generally the best impact modification may be achieved when polymerized styrene content is about 10 to about 35 weight percent.

The rubber blocks of the modified block copolymer may comprise ethylene/propylene, ethylene/butylene or ethylene/pentylene polymer blocks or combinations thereof. Proportions of ethylene and propylene, butylene or pentylene units in these blocks can vary widely. Such blocks may also contain minor amounts of ethylenic unsaturation, preferably no more than about 15 weight percent unsaturation inasmuch as higher levels may lead to inadequate thermal stability of the functionalized block copolymers.

The functionalized block copolymer generally comprises from about 0.1 to about 10 weight percent pendant succinic anhydride groups, with about 0.5 to about 5 weight percent being preferred. Although still lower levels may be employed, low levels may lead to inadequate incorporation of the modifying component into the polyphthalamide component. Levels greater than about 5 wt % generally do not provide appreciable benefits, and are thus not preferred. These pendant groups are bonded predominantly to one or more; of the secondary or tertiary carbons of the propylene, butylene or pentylene groups or to benzylic carbons of the styrene groups. Preferably, the block copolymer is a hydrogenated block copolymer comprising one or more polymerizable vinyl aromatic monomers such as styrene, alpha methylstyrene, vinyl toluene, vinyl naphthalene or the like, and one or more conjugated diene monomers copolymerizable therewith. Suitable copolymers include block copolymers of styrene and 1,3-butadiene or isoprene hydrogenated to have residual unsaturation of up to about 10% of its original unsaturation content. In such hydrogenated styrene-butadiene block copolymers the rubber blocks comprise ethylene/butylene polymer blocks with proportions of ethylene and butylene units varying depending on the relative levels of 1,2 and 1,4 addition of the diene in the unhydrogenated copolymer. It also is preferred that the pendant succinic anhydride groups result from reaction of such a hydrogenated block copolymer with maleic anhydride. These and other suitable functionalized rubbery block copolymer impact modifiers and methods for their preparation are described in U.S. Pat. No. 4,795,782, to Gergen and Lutz, the teachings of which are hereby incorporated herein by reference.

A specific example of a preferred functionalized rubbery impact modifier suitable for use according to the present invention is a styreneoethylene/butylene-styrene block copolymer with pendant succinic anhydride groups, which is available commercially as Kraton ® FG1901X rubber from Shell Chemical Company. The modifier may also be described as a maleic anhydride-grafted, hydrogenated styrene-butadiene block copolymer, or as a maleated SEBS. This product contains about 29 weight percent polymerized styrene, about 2 weight percent pendant succinic anhydride groups and has a glass transition temperature of its hydrogenated, polymerized butadiene block of about −42° C. Onset of thermal degradation of this material occurs between about 270° C. and about 315° C., as determined by Thermal Gravimetric Analysis, and the manufacturer's literature (MSDS 2,898-1, dated Jun. 22, 1987) states that in processing, temperature should not be allowed to exceed 550° F. (287° C.).

The functionalized block copolymer can be prepared by any suitable technique. One such method is as disclosed in the previously discussed published European Patent Application. No. 0211467 of Gelles et al., which is incorporated herein by reference. As disclosed therein, styrene-butadiene block copolymers having about 7 to about 100 percent 1,2-microstructure are prepared by polymerization of styrene and 1,3-butadiene with sequential or incremental addition of monomers or by coupling techniques. The monomers preferably are utilized so as to provide about 10 to about 50, and more preferably, about 10 to about 35 weight percent polymerized styrene in the block copolymer. Hydrogenation of such copolymers can be conducted by known techniques, for example by hydrogenation of the block copolymer dissolved in a hydrocarbon solvent, such as cyclohexane, in the presence of Raney nickel, noble metal or soluble transition metal catalysts. The hydrogenation is conducted substantially to eliminate residual unsaturation in the diene block of the block copolymer although a small amount of residual unsaturation, e.g. up to about 10 percent of the original unsaturation content, may remain in the hydrogenated product. The hydrogenated product, comprising styrene and ethylene/butylene blocks, then is grafted to provide about 0.5 to about 5 weight percent pendant succinic anhydride groups by reaction with maleic anhydride. Preferably, this reaction is conducted using a free radical initiator. The grafting reaction can be conducted in solution or in the melt. Similar techniques can be utilized for preparation and hydrogenation of styrene-isoprene or styrene-butadiene-isoprene co- or terpolymers and grafting of the hydrogenated polymers. Another suitable method, wherein pendant succinic anhydride groups are bonded predominantly to benzylic carbons of styrene units of the block copolymer, is that disclosed in the aforementioned U.S. Pat. No. 4,783,503 to Gergen et al. which is incorporated herein by reference.

Alternative functionalized rubbery impact modifiers that may also be used in the practice of the invention include ethylene-higher alpha-olefin polymers and ethylene-higher alpha-olefin-diene polymers that have been provided with reactive functionality by being grafted or copolymerized with suitable reactive carboxylic acids or their derivatives such as, for example, acrylic acid, methacrylic acid, maleic anhydride or their esters, and will have a tensile modulus up to about 50,000 psi determined according to ASTM D-638. Suitable higher alpha-olefins include $C_3$ to $C_8$ alpha-olefins such as, for example, propylene, butene-1, hexene-1 and styrene, with propylene being preferred. Alternatively, copolymers having structures comprising such units may also be obtained by hydrogenation of suitable homopolymers and copolymers of polymerized 1-3 diene monomers. For example, polybutadienes having varying levels of pendant vinyl units are readily obtained, and these may be hydrogenated to provide ethylene-butene copolymer structures. Similarly, hydrogenation of polyisoprenes may be employed to provide equivalent ethylene-isobutylene copolymers.

Suitable dienes for use in the preparation of ethylene-alpha-olefin-diene terpolymers are non-conjugated dienes having 4 to about 24 carbon atoms, examples of which include 1,4-hexadiene, dicyclopentadiene and alkylidene norbornenes such as 5-ethylidene-2-norbornene. Mole fractions of ethylene units and higher alpha-olefin units in the ethylene-higher alpha-olefin copolymer rubbers generally range from about 40:60 to about 95:5. Ethylene-propylene copolymers having about 70 to about 95 mole percent ethylene units and about 5 to about 30 mole percent propylene units are preferred among these. In terpolymers comprising polymerized diene monomer, the diene unit content can range up to about 10 mole percent with about 1 to about 5 mole percent being preferred. Also suitable are the corresponding block copolymers comprising two or more polymeric blocks, each formed of one or more monomers selected from ethylene and the higher alpha-olefin. The functionalized polyolefins will generally further comprise about 0.1 to about 10 weight percent functional groups. Specific examples of suitable, commercially-produced functionalized polyolefins include maleic anhydride-functionalized ethylene-propylene copolymer rubber comprising about 0.6 weight percent pendant succinic anhydride groups, identified as EXXELOR ® VA 1801 from Exxon Chemical Company; and maleic anhydride-functionalized ethylene-propylene-diene monomer terpolymer rubber comprising about 1 weight percent pendant succinic anhydride groups, identified as ROYALTUF 465 from the Uniroyal Company.

The preferred polyolefin component useful in the practice of this invention will be a polypropylene, including both propylene homopolymers and copolymers of propylene comprising minor amounts of one or more copolymerizable alpha olefins such as ethylene, butene-1, pentene-1 and the like. Methods for the production of such polymers are widely known in the art, and suitable polypropylenes are readily available commercially for use as molding and extrusion resins. The preferred polypropylenes are molding and extrusion grade resins having weight average molecular weights typically greater than about 100,000, and are those identified in the art as substantially crystalline homopolymers. Impact grades of these polyolefins are also available and may be suitable for these purposes. A variety of other polyolefins such as polyethylene, polybutene-1, polyisobutylene, polymethylpentene and their copolymers and the like may also be found suited for these purposes.

Blends of polyolefins with highly polar resins such as polyamides are not generally compatible, and the art has developed a variety of compatibilizing additives to overcome this; deficiency. Among the variety of compatibilizing additives known for such use are carboxyl-modified polyolefins obtained, for example, by grafting polypropylene with a suitable carboxylic compound such as a carboxylic acid, for example acrylic or methacrylic acid, a carboxylic acid arthydride such as maleic acid, an acid amide such as acrylamide or the like in the presence of a peroxide compound. A variety of processes have been developed for the preparation of such additives including, for example, melt-mixing a mixture of polypropylene and the reactants in a compounding extruder. A variety of such processes have been described in the art, for example, in U.S. Pat. No. 5,001,197 and the references discussed therein. The additives may comprise as little as 0.01 wt % carboxyl functionality, more preferably from about 0.1 to as great as 5 wt % or greater carboxyl functionality. The molecular weight of the polymeric additive, which will depend in part on the molecular weight of the polyolefin used in its preparation, is not particularly critical; according to published information, the additives preferred for use with polyamides are those having a melt index in the range of about 0.5 to about 200 g/10 min. Suitable additives are well known and widely available to the trade from commercial sources, including the maleated polypropylenes supplied as Hercoprime G from Himont Corporation and the Exxelor PO series of additives from Exxon Chemical Company, as well as the acrylic acid-grafted polypropylenes and maleated polypropylenes sold under the Polybond label by BP Polymers, Inc. and more recently by Uniroyal.

The polyphthalamides blends according to the invention have an outstanding balance of mechanical properties together with good rigidity. Aromatic polyamides are high melt-temperature thermoplastics and are particularly important for use at elevated temperatures and where rigidity as reflected in a high modulus value is important. The use of lubricants and processing aids to improve processability often will plasticize the resin, reducing rigidity and detrimentally affecting other mechanical properties. Blends according to this invention comprising polyphthalamide, functionalized rubbery impact modifier and polypropylene in amounts of from about 50 to about 90 wt % polyphthalamide, from about 5 to about 20 wt % functionalized rubbery impact modifier, and from about 5 to about 20 wt % polypropylene are substantially improved in ductility as, reflected in elongation yet retain a usefully high level of mechanical properties, particularly strength and rigidity. Optionally, a functionalized polypropylene may also be included, and where functionalized polypropylene is employed, an amount in the range of from about 5 to about 20 wt % further enhances ductility while maintaining a useful level of rigidity. Blends comprising polypropylene and functionalized polypropylene in a weight ratio of from about 1:3 to about 3:1 generally exhibit excellent impact properties and blends comprising polypropylene and functionalized polypropylene in these ratios are therefore particularly preferred for use where good impact in addition to rigidity and ductility are desired.

This surprising and unexpected improvement in ductility with retention of modulus will be of particular importance to the commercial utility of these blends, particularly where the part will be required to undergo repeated flexing without cracking or brittle failure. The invention may thus also be described as further directed to a method for improving the toughness of polyphthalamides.

The polyphthalamide compositions of this invention may further comprise a filler such as a reinforcing filler or structural fiber. Structural fiber useful in forming filled articles and composite products may include glass fiber, carbon or graphite fibers and fibers formed o,f silicon carbide, alumina, titania, boron and the like, as well as fibers formed from high temperature engineering resins such as, for example, poly(benzothiazole), poly(benzimidazole), polyarylates, poly(benzoxazole), aromatic polyamides, polyaryl ethers and the like, and may include mixtures comprising two or more such fibers. Preferably, the fibers will be selected from glass fibers, carbon fibers and aromatic polyamide fibers such as the fibers sold by the DuPont Company under the trade name Kevlar. The resin blend may be filled with structural fiber in the form of chopped or short fibers, flock, fiber pulp, fibrils and the like to provide molding compositions. Alternatively, the resin blend may be reinforced with fiber in the form of continuous tows of typically from 500 to 420,000 filaments, as continuous unidirectional tape or as woven cloth for providing laminates and structural composites. For most applications, and particularly for use in fiber-filled molding resins, the preferred fiber will be glass fiber, more preferably chopped glass fiber, and will be from about 2 to 50 microns, preferably from about 2 to about 20 microns, and more preferably less than about 10 microns in diameter and generally will be less than about ½ inch in length.

Other fillers which may also be used in the filled polyphthalamide molding and extrusion resins according to the invention are the commonly employed flake, spherical and fibrous particulate filler reinforcements and nucleating agents such as talc, mica, titanium dioxide, potassium titanate, silica, kaolin, chalk, alumina, mineral fillers and the like. The fillers and structural fiber may be used alone or in any combination. To provide composite products, the polyphthalamide blends of this invention will comprise from about 10 to about 80 wt % structural fiber or filler or a mixture thereof, while filled molding resins will comprise from about 10 to about 60 wt %, more preferably from about 20 to about 45 wt % particulate filler or structural fiber or a mixture thereof.

The polyphthalamide blends of this invention may also be combined with pigments, dyes, fillers and the like as is commonly practiced in the resin arts, and these further additives may be employed alone or in any combination as needed. For particular applications, it may also be useful to include plasticizers, lubricants and mold release agents, as well as thermal, oxidative and light stabilizers and the like. The levels of such additives will be determined for the particular use envisioned, with up to about 50 wt %, based on total composition, of such additional additives considered to be within the range of ordinary practice in the molding and extrusion arts.

The invention will be better understood by consideration of the following Examples, which are provided by way of illustration of the invention and are not intended to be limiting thereof. In the Examples, all parts are by weight, and all temperatures are given in Centigrade unless otherwise noted.

EXAMPLES

The following materials and formulations are employed in the Examples.

Polyphthalamides employed in the examples were prepared generally by the processes described herein above and set forth in U.S. Pat. Nos. 4,603,193 and 4,831,108 and U.S. Pat. No. Re. 34,447. In many of the examples, polyphthalamides were obtained from commercial sources.

Polyphthalamide I: Hexamethylene terephthalamide-isophthalamide-adipamide terpolymer, mole ratio 65/25/10, inherent viscosity of 0.94 dl/g determined at 30° C. in a 60/40 phenol/TCE mixture at a concentration of 0.4 g/dl. The resin Tg=126° C., and Tm=311° C. Obtained as Amodel® A1000 polyphthalamide from Amoco Chemical Company.

Polyphthalamide II: Hexamethylene terephthalamide-isophthalamide-adipamide terpolymer, mole ratio 55/5/40, inherent viscosity of 0.9 dl/g determined at 30° C. in a 60/40 phenol/TCE mixture at a concentration of 0.4 g/dl. The resin Tg=94° C., and Tm=303° C.

Polyphthalamide III: Hexamethylene terephthalamide-isophthalamide-adipamide terpolymer, mole ratio 50/5/45, inherent viscosity of 0.85 dl/g determined at 30 ° C. in a 60/40 phenol/TCE mixture at a concentration of 0.4 g/dl. The resin Tg=88° C., and Tm=296° C.

Polyphthalamide IV: Hexamethylene terephthalamide-adipamide copolymer, mole ratio 60/40, inherent viscosity of 1.01 dl/g determined at 30° C. in a 60/40 phenol/TCE mixture at a concentration of 0.4 g/dl. The resin Tg=95° C., and Tm=317° C.

Polyphthalamide V: Hexamethylene terephthalamide-isophthalamide-adipamide terpolymer, mole ratio 55/10/35, inherent viscosity of 0.91 dl/g determined at 30° C. in a 60/40 phenol/TCE mixture at a concentration of 0.4 g/dl. The resin Tg=94° C., and Tm=301° C.

Polyphthalamide VI: Hexamethylene terephthalamide-adipamide copolymer, mole ratio 50/50, inherent viscosity of 0.93 dl/g determined at 30° C. in a 60/40 phenol/TCE mixture at a concentration of 0.4 g/dl. The resin Tg=84° C., and Tm=305° C.

Polyphthalamide VII: Hexamethylene terephthalamide-adipamide copolymer, mole ratio 55/45, inherent viscosity of 0.88 dl/g determined at 30° C. in a 60/40 phenol/TCE mixture at a concentration of 0.4 g/dl. The resin Tg=84° C., and Tm=312° C.

Polypropylene I: Crystalline polypropylene obtained from Amoco Chemical Company as Amoco 5013. The polymer has an ASTM D1238 MFR value of 3.7 g/10 min and an IV of 2.05 (decalin, 135° C.) and contains stabilizers.

Polypropylene II: Impact polypropylene random copolymer comprising minor amounts of ethylene (<5%) comonomer and a impact modifier, obtained from Amoco Chemical Company as ACCTUF 3045. The polymer has an ASTM D1238 MFR value of 0.5 g/10 rain and contains stabilizers.

Carboxylated Modifiers

CarboxyPP: Maleated propylene polymer having 0.4 wt % carboxyl functionality (published value), obtained as Exxelor PO 1015 from Exxon Chemical Company.

CarboxyEP: Anhydride-grafted, low melt viscosity ethylene-polypropylene copolymer elastomer having approximately 0.7 wt % bound maleic anhydride, obtained as Exxelor PO 1803 from Exxon Chemical Company.

CarxboxyEPDM: Anhydride-grafted EPDM (ethylene-polypropylene-diene monomer terpolymer) having an ethylene/propylene ratio of 75/25 and a 0.4 wt % bound maleic anhydride content, obtained as Royaltuf 465A from Uniroyal.

CarboxySEBS: Maleic anhydride-grafted, hydrogenated styrene-butadiene block copolymer containing about 29 weight percent polymerized styrene, about 2 weight percent pendant succinic anhydride groups and having a glass transition temperature of its hydrogenated, polymerized butadiene block of about −42° C., obtained as Kraton® FG 1901X rubber from Shell Chemical Company.

The blends were also formulated according to common practice in the resin compounding art to include varying levels, generally from 0.2 to as great as 2.0 wt % based on total weight of the resin components, of one or more conventional ultraviolet and thermal-oxidative stabilizers.

Test Procedures

Mechanical Properties.

The mechanical properties are room temperature properties, determined according to ASTM published procedures D638 (Type I tensile properties), D-790 (flexural properties) and D-256 (notched Izod impact) unless otherwise noted. The heat deflection properties were determined by ASTM D648. Tg and Tm values were determined by conventional differential scanning calorimetry methods (DSC) at a heating rate of 20° C. min, using dry, as-molded test specimens unless otherwise noted; the values reported are for the second heat, after a slow cool to room temperature from the first heat to eliminate prior thermal history effects.

The methods of the following Examples are representative of those that may be employed for preparing the resin formulations according to the practice of this invention. The processes will be generally recognized by those skilled in the art as processes and methods commonly employed for the production of resin blends and molded articles and filled resin composites. The specimens of commercial resins used as controls were prepared and tested using substantially the same processes and conditions employed for the examples according to the invention. The test results may vary from published data for commercial materials processed in different equipment under other processing conditions.

Various samples of Polyphthalamide I were employed in preparing the blends. For comparison proposes, physical properties determined for specimens molded from the neat resins are reported where appropriate as Control examples.

Examples 1–3

Polymer blends were prepared by extrusion compounding polypropylene and functionalized impact modifier with polyphthalamide. The dried polymer components were first mixed in a tumble mixer, together with stabilizers when employed, then fed to the first feed port of a Berstorf 25 mm. twin screw extruder using a nitrogen-purged hopper feeder at a rate of approximately 20 lb/hr. The melt temperatures during the extrusion ranged generally from 285° to about 320° C., depending in part on the ratio of polyphthalamide to polypropylene. The extrudate, after cooling in a water bath, was chopped and then vacuum dried before being injection molded using an Arburg 221E/150 molding machine to form the injection molded test specimens. Control Examples A–D, omitting one or more components, were prepared, molded and tested by the same procedures. The compositions and properties are summarized in Table I.

It is known in the art that blends of polyphthalamides with polyolefins such as polypropylene suffer from the inherent incompatibility of the two resins. Improved compatibility is observed for blends of polyamides with a functionalized polyolefin, for example a maleated polypropylene. However, replacing a portion of the carboxylated block copolymer with a functionalized polypropylene as in Control D is found to substantially reduce ductility as shown by elongation, and does not improve the rigidity, as shown by comparing the flexural modulus values for Control D with those of Control C and Example 3. It is thus surprising that an unmodified polyolefin such as polypropylene may be effective in combination with a functionalized rubbery impact modifier for improving ductility while maintain-

TABLE I

| Example No.: | | A | B | 1 | C | 2 | 3 | D |
|---|---|---|---|---|---|---|---|---|
| Blend Components[1] | | | | | | | | |
| Polyphthalamide I, | wt % | 100 | 85 | 85 | 75 | 75 | 75 | 75 |
| Carboxy SEBS | wt % | — | 15 | 7.5 | 25 | 15 | 7.5 | 7.5 |
| Polypropylene I, | wt % | — | — | 7.5 | — | 10 | 17.5 | — |
| CarboxyPP, | wt % | — | — | — | — | — | — | 17.5 |
| Mechanical Properties[2] | | | | | | | | |
| Izod impact | ft lb/in notch | 1.0 | — | — | 21 | 20 | 1.5 | 1.5 |
| Flex. Str. | Kpsi | 27.3 | 18.9 | 18.6 | 12.1 | 13.6 | 12.2 | 14.6 |
| Ult. Tensile Str. | Kpsi | 13.2 | 9.8 | 9.6 | 8.0 | 8.4 | 7.9 | 7.7 |
| Elong. at Break | % | 7 | 59 | 54 | 40 | 32 | 20 | 1.4 |
| Flex. Modulus | kpsi | 534 | 379 | 391 | 277 | 311 | 347 | 281 |

Notes:
[1]For blend components, see text. Formulations contain 0.5 wt % stabilizers.
[2]Room temperature mechanical properties. For details of determinations, see text; Flex. Str. = flexural strength; Ult. Tensile Str. = tensile strength at break; Elong. at Break = elongation at break; Flex. Modulus = flexural modulus.

As will be apparent from a consideration of the mechanical properties for the formulations set forth in Table I, the addition of a functionalized rubber such as a carboxylated block copolymer impact modifier to polyphthalamides provides significant improvement in the impact properties as well as in ductility as reflected in the elongation at break values for Controls B and C compared with the neat polyphthalamide, Control A. However, the presence of the impact modifier causes a marked reduction in strength as shown by flexural and tensile strengths of these control formulations, and in rigidity as shown by the lowered flexural modulus values.

Replacing a portion of the carboxylated block copolymer with polypropylene serves to increase the rigidity of the impact-modified formulations, again as shown by the flexural modulus values. Compare Control B with Example 1 and Control C with Examples 2 and 3. While the formulations with polypropylene are somewhat reduced in elongation, a reasonable level of ductility is retained, even though the impact properties may be significantly reduced, as in Example 3.

ing a good level of rigidity.

While some formulations may exhibit a remarkably high impact, see Examples 2 and Control C, the good ductility as reflected in the elongation values will be apparent even for formulations where the Izod impact is low, as in Example 3.

Particularly desirable formulations result when the polyphthalamide is blended with the functionalized rubbery impact modifier in combination with a polyolefin and a carboxylated polyolefin.

Examples 4–6

Additional polymer blends were prepared by extrusion compounding polypropylene, functionalized impact modifier, and carboxylated polypropylene with the polyphthalamide in various combinations. The compounding, molding and testing were carried out substantially by the procedures followed for Examples 1–3. The compositions and properties for the formulations are summarized in the following Table II.

TABLE II

| Example No.: | | 1 | 4 | 2 | 5 | 3 | 6 |
|---|---|---|---|---|---|---|---|
| Blend Components[1] | | | | | | | |
| Polyphthalamide I | wt % | 85 | 85 | 75 | 75 | 75 | 75 |
| Carboxy SEBS | wt % | 7.5 | 7.5 | 15 | 15 | 7.5 | 7.5 |
| Polypropylene I | wt % | 7.5 | 3.75 | 10 | 5 | 17.5 | 10 |
| CarboxyPP | wt % | — | 3.75 | — | 5 | — | 7.5 |
| Mechanical Properties[2] | | | | | | | |
| Izod impact | ft lb/in notch | — | — | 20 | 23 | 1.5 | 3 |
| Flex. Str. | Kpsi | 18.6 | 18.4 | 13.6 | 13.5 | 12.2 | 14.5 |
| Ultimate Tensile Str., | Kpsi | 9.6 | 10.1 | 8.4 | 8.6 | 7.9 | 8.0 |
| Elong. at Break | % | 54 | 60 | 32 | 49 | 20 | 33 |
| Flex Modulus | Kpsi | 391 | 390 | 311 | 308 | 347 | 334 |

Notes: See notes to Table 1

Replacing a portion of the carboxylated block copolymer impact modifier with a combination of polypropylene and a functionalized polypropylene will be considerably more effective in improving ductility while maintaining rigidity, as shown in Table II. The elongation at break for the formulation of Example 4 is greater than the combination with polypropylene alone, compare Example 1, while the rigidity is little affected. The increase in ductility is substantial for resins with higher levels of the additives. Compare Example 5 with Example 2, and Example 6 with Example 3. Again, the rigid characteristics of these formulations are substantially maintained, as are the strength properties. The retained rigidity is particularly surprising when the effect of carboxylated polypropylene alone on rigidity is considered. See Control D, Table I.

Examples 7–13

A further demonstration of the unique character of the blends according to the invention comprising polyphthalamide, carboxylated rubbery impact modifier and polyolefin is provided by consideration of the properties of the blends of Examples 7–13. The processes employed for Examples 1–3 were substantially followed in compounding, molding and testing these blends. The formulations and properties are summarized in the following Table III.

comprising less than 75 wt %, and particularly those with less than about 65 wt %, polyphthalamide generally will be seen to have low strength and rigidity characteristics, these formulations may also be desirable for a wide variety of applications where a high level of ductility is required.

Examples 14–25

Additional compositions comprising other polyphthalamides and functionalized rubbery impact modifiers were prepared, molded and tested substantially by the following the procedures of Examples 1–3. Polyphthalamide II, employed in Examples 14–18, had a notched Izod impact of 0.2 ft lbs/in notch, a flexural strength of 20.6 kpsi and a flexural modulus of 531 Kpsi. The compositions and properties are summarized in the following Tables IV and V.

TABLE IV

| Example No.: | | 14 | 15 | 16 | 17 | 18 | 19 | 20 | 21 |
|---|---|---|---|---|---|---|---|---|---|
| Blend Components[1] | | | | | | | | | |
| Polyphthalamide I | wt % | — | — | — | — | — | 70 | 70 | 70 |
| Polyphthalamide II | wt % | 75 | 75 | 75 | 75 | 75 | — | — | — |
| Carboxy SEBS | wt % | — | — | — | — | — | — | — | 5 |
| CarboxyEP | wt % | 25 | 10 | 10 | 12.5 | 12.5 | 10 | — | — |
| CarboxyEPDM | wt % | — | — | — | — | — | — | 10 | 5 |
| Polypropylene I | wt % | — | 15 | 7.5 | 12.5 | 7.5 | 15 | 15 | 15 |
| CarboxyPP | wt % | — | — | 7.5 | — | 5 | 5 | 5 | 5 |
| Mechanical Properties[2] | | | | | | | | | |
| Flex Strength | kpsi | 9.5 | 11.9 | 11.5 | 11.7 | 10.9 | — | — | — |
| Ult. Tensile Str. | kpsi | 6.5 | 7.4 | 7.3 | 7.3 | — | 7.7 | 8.1 | 8.0 |
| Elong. at Break | % | 6 | 8 | 21 | 9 | 24 | 21 | 17 | 16 |
| Flex Modulus | kpsi | 243 | 294 | 270 | 296 | 269 | 288 | 312 | 308 |

Notes: See notes to Table I

Again, the ductility of the blends with functionalized rubbery impact modifier as in Example 14 is good, while the addition of polypropylene as in Examples 15 and 17 affords good ductility and strength together with acceptable rigidity. The combination of polypropylene with carboxylated polypropylene, Examples 16 and 18, provides significantly better ductility as reflected by the increase in elongation, yet without a concomitant re-

TABLE III

| Example No.: | | 7 | 8 | 9 | 10 | 11 | 12 | 13 |
|---|---|---|---|---|---|---|---|---|
| Blend Components[1] | | | | | | | | |
| Polyphthalamide I | wt % | 70 | 70 | 65 | 60 | 60 | 60 | 55 |
| Carboxy SEBS | wt % | 10 | 5 | 5 | 15 | 10 | 5 | 5 |
| Polypropylene I | wt % | 15 | 20 | 25 | 20 | 25 | 30 | 35 |
| CarboxyPP | wt % | 5 | 5 | 5 | 5 | 5 | 5 | 5 |
| Mechanical Properties[2] | | | | | | | | |
| Izod impact | ft lb/in notch | 1.9 | 1.5 | 1.6 | 2.1 | 1.7 | 1.6 | 1.6 |
| Flex. Str. | Kpsi | 11.6 | 12.2 | 7.1 | 3.9 | 4.8 | 7.1 | 6.1 |
| Ultimate Tensile Str. | Kpsi | 7.9 | 8.6 | 5.0 | 2.9 | 3.5 | 5.0 | 3.8 |
| Elong. at Break | % | 11 | 6 | 14 | 32 | 26 | 14 | 17 |
| Flex. Modulus | kpsi | 263 | 279 | 217 | 106 | 144 | 217 | 205 |

Notes: See notes to Table I.

The blends set forth in Table III are again improved in rigidity as the level of polypropylene is increased, and exhibit good strength properties for resin blends with greater than about 65 wt % polyphthalamide. It will again be apparent the invented method for improving the ductility and rigidity characteristics of polyphthalamide formulations comprising functionalized robbery impact modifier will be effective even at levels as low as about 55 or 60 wt % polyphthalamide. Although blends duction in rigidity and strength properties. Note also the good ductility, rigidity and strength properties of Example 19, based on a formulation having a lower level of a different polyphthalamide. Similarly, formulations of this polyphthalamide with a functionalized EPDM rubbery impact modifier as in Example 20, and with a mixture of functionalized SEBS and functionalized EPDM rubbery impact modifiers as in Example 21, also exhibit good ductility, strength and rigidity.

TABLE V

| Example No.: | | E | 22 | 23 | 24 | 25 |
|---|---|---|---|---|---|---|
| Blend Components[1] | | | | | | |
| Polyphthalamide III | wt % | 100 | 75 | 75 | 75 | 75 |
| Carboxy SEBS | wt % | — | — | — | 7.5 | 7.5 |
| CarboxyEP | wt % | — | 10 | 10 | — | — |
| Polypropylene I | wt % | — | 15 | 7.5 | 17.5 | 12.5 |
| CarboxyPP | wt % | — | — | 7.5 | — | 5 |
| Mechanical Properties[2] | | | | | | |
| Izod impact | ft lb/in notch | 0.5 | 3.6 | 17 | 1.0 | 9.5 |
| Flex Strength | kpsi | 21.3 | 12.3 | 12.7 | 12.7 | 12.7 |
| Ult. Tensile Str. | kpsi | 12.0 | 7.5 | 58 | 6.7 | 7.5 |
| Elong. at Break | % | 10 | 8 | 58 | 4 | 33 |
| Flex Modulus | kpsi | 519 | 297 | 305 | 367 | 291 |

Notes: See notes to Table I.

The blends with functionalized rubbery impact modifier and polypropylene such as in Examples 22 and 24, possess good ductility and strength together with acceptable rigidity. The combination of polypropylene with carboxylated polypropylene as in Example 23 provides significantly better ductility as reflected by the increase in elongation, yet without a concomitant reduction in rigidity and strength properties. Note also the good ductility, rigidity and strength properties of the formulation of Example 25, though at this level of polypropylene, the propylene/carboxyl-modified polypropylene ratio is not optimized to provide the best improvement in rigidity.

Examples 26–31

Additional compositions comprising still other polyphthalamides, polypropylenes and functionalized rubbery impact modifiers were prepared, molded and tested substantially by following the procedures of Examples 1–3. The compositions and properties are summarized in the following Table VI

TABLE VI

| Example No.: | | 26 | 27 | 28 | 29 | 30 | 31 |
|---|---|---|---|---|---|---|---|
| Blend Components[1] | | | | | | | |
| Polyphthalamide IV | wt % | 70 | — | — | — | — | — |
| Polyphthalamide V | wt % | — | 70 | — | — | — | — |
| Polyphthalamide VI | wt % | — | — | 70 | 75 | 75 | — |
| Polyphthalamide VII | wt % | — | — | — | — | — | 70 |
| Carboxy SEBS | wt % | — | — | — | — | — | 7.5 |
| CarboxyEP | wt % | — | — | — | 7.5 | 7.5 | — |
| CarboxyEPDM | wt % | 5 | 5 | 5 | 5 | 5 | — |
| Polypropylene I | wt % | — | — | — | 12.5 | — | — |
| Polypropylene II | wt % | 15 | 15 | 15 | — | 12.5 | 15 |
| CarboxyPP | wt % | 10 | 10 | 10 | — | — | 7.5 |
| Mechanical Properties[2] | | | | | | | |
| Izod impact | ft lb/in notch | 2.2 | 2.1 | 2.3 | — | — | — |
| Flex Strength | kpsi | 14.1 | 13.8 | 11.4 | 11.1 | 11.0 | 11.7 |
| Ult. Tensile Str. | kpsi | 8.9 | 7.9 | 7.2 | 7.2 | 6.8 | 7.6 |
| Elong. at Break | % | 9.6 | 19 | 20 | 19 | 14 | 37 |
| Flex Modulus | kpsi | 357 | 323 | 282 | 265 | 268 | 269 |

Notes: See notes to Table I. Examples 26–31 include 1.5 wt % stabilizers, and Example 31 includes 2.0 wt % stabilizers, based on total weight of resin components.

Again, the blends have good ductility, together with acceptable strength and rigidity.

Example 32

Polyphthalamide I (80 parts by weight) and 15 parts by weight Carboxy SEBS rubbery impact modifier and ,5 parts by weight of a commercial polypropylene resin having a melt flow rate of about 4 g/10 min. obtained from Amoco Chemical Company were tumbled in a five gallon jar for about five minutes. The dry blend then was fed to a ZSK-30 twin screw extruder and melt compounded using barrel temperature settings of about 400° F. in an initial zone, 600° F. in four intermediate zones and 580° F in a final zone at a throughput rate of 30 pounds per hour and screw speed of 150 rpm under vacuum of 10 inches of mercury. The compounded melt was pelletized and the pellets then were dried at about 110° C. for about 16 hours under vacuum and molded into test specimens using an Arburg injection molding machine operated at barrel temperatures of 570° F. in a first zone, 590° F. in a second zone and 590° F. in a final zone. Mold temperature was 250° F. The blend had an Izod impact of 12.9 ft-lb/in notch, a yield tensile strength of 11.0 Kpsi, an elongation at break of 21% and a flex modulus of 429 Kpsi. An impact-modified polyphthalamide control blend was prepared in substantially the same manner from 85 parts by weight of Polyphthalamide I and 15 parts by weight of the Carboxy SEBS modifier. The control blend had an Izod impact of 16.3 ft-lb/in notch, a yield tensile strength of 11.7 Kpsi, an elongation at break of 23 % and a flex modulus of 307 Kpsi.

As can be seen by comparing properties of the blend of Example 32 with those of the corresponding control, adding 5 parts by weight polypropylene to the impact-modified polyphthalamide had only a minor effect on ductility as measured by elongation, while significantly improving the rigidity as reflected in the flexural modulus value.

Comparative Examples

Blends comprising an aliphatic polyamide were prepared for comparison purposes, substantially according to the methods employed in Examples 1–3. The formulations and properties are summarized in Table VI.

TABLE VII

| Example No.: | | F | G | H | I |
|---|---|---|---|---|---|
| Blend Components[1] | | | | | |
| Nylon 6,6 | wt % | 100 | 75 | 75 | 75 |
| Carboxy SEBS | wt % | — | 7.5 | 7.5 | 7.5 |
| Polypropylene I | wt % | — | 17.5 | — | 10 |
| CarboxyPP | wt % | — | — | 17.5 | 7.5 |
| Mechanical Properties[2] | | | | | |
| Flex Strength | kpsi | 29.9 | 15.1 | 12.7 | 12.5 |
| Ultimate Tensile Str. | kpsi | 11.1 | 7.2 | 5.8 | 7.2 |
| Elong. at Break | % | 20 | 36 | 54 | 67 |
| Flex Modulus | kpsi | 500 | 374 | 308 | 297 |

Unlike the blends with polyphthalamides, compositions comprising nylon 6,6 are reduced in strength when combined with polypropylene or carboxylated polypropylene, and significantly reduced in rigidity when a combination of the two is employed.

In the following Table VIII, blends comprising polyphthalamide and polypropylene are provided to demonstrate the effect on properties of blending polypropylene alone with polyphthalamide.

TABLE VIII

| Example No.: | | J | K | L |
|---|---|---|---|---|
| Blend Components[1] | | | | |
| Polyphthalamide I | wt % | 100 | 90 | 50 |
| Polypropylene I | wt % | — | 10 | 50 |
| Mechanical Properties[2] | | | | |
| Ult. tensile Str. | psi | 13,200 | 11,310 | 6,900 |
| Elong at break | % | 4.6 | 4.5 | 4.3 |
| HDT, 264 psi | °F. | 240 | 235 | 218 |

It will be seen that for the neat resin blends, the addition of polypropylene to polyphthalamide effects a lowering in HDT but sharply reduces strength properties; compare Control K and Control L with Control J.

The invention will thus be seen to be a blend comprising a polyphthalamide comprising aliphatic diamine terephthalamide units, a functionalized rubbery impact modifier and crystalline polypropylene, optionally further comprising a carboxylated polyolefin, as well as to molded articles made therefrom and to a method for improving the balance of rigidity and ductility characteristics for impact-modified polyphthalamides.

More particularly, the blend according to the invention will comprise from about 50 to about 90 wt % polyphthalamide, from about 5 to about 25 wt % functionalized rubbery impact modifier, from 5 to about 30 wt % polypropylene and from 0 to about 20 wt % of carboxyl-modified polyolefin, preferably carboxyl-modified polypropylene, and, more preferably, where both are present the blend will comprise polypropylene and carboxyl-modified polypropylene in ratios of from about 3:1 to about 1:3. The polyphthalamide may be further described as having a Tg greater than about 75° C. and a Tm greater than about 270° C. and comprising terephthalamides of acyclic or cycloaliphatic $C_2$–$C_{12}$ aliphatic diamines with at least one additional diamide selected from aromatic diamides of aliphatic diamines and $C_4$–$C_{12}$ acyclic and cycloaliphatic dicarboxylic amides of aliphatic diamines. More preferably the polyphthalamide will be a crystalline or crystallizable polyphthalamide comprising from about 40 to about 90 mole % aliphatic diamine terephthalamide units, from about 50 to about 10 mole % aliphatic diamine adipamide units, and from about 0 to about 30 mole % aliphatic diamine isophthalamide units, and still more preferably the aliphatic diamine portion will comprise a C6 aliphatic diamine, the preferred diamine being hexamethylene diamine.

The invention may also be characterized as a method for improving the rigidity of polyphthalamides and particularly impact-modified copolyphthalamide compositions comprising a polyphthalamide comprised of aliphatic diamine terephthalamide units and a functionalized rubbery impact modifier, said method comprising compounding the impact modified polyphthalamide with up to 20 wt %, preferably from about 5 to about 30 wt % polypropylene, optionally including from up to about 20 wt % carboxylated polypropylene, based on total resin components. Such improved polyphthalamides exhibit surprisingly improved rigidity while retaining excellent ductility and strength.

The invention has been described and illustrated by way of specific embodiments set forth herein including examples comprising impact-modified polyphthalamide, polypropylene and, optionally, a carboxyl-modified polypropylene. Those skilled in the art will recognize that still further modifications may be made, and further variations will also be readily apparent to those skilled in the resin formulating and resin fabricating art, and such variations and modifications will be included within the scope of the invention as defined by the appended claims.

We claim:

1. A blend comprising (a) from about 75 to about 90 wt % polyphthalamide comprising at least about 40 mole percent recurring aliphatic diamine terephthalamide units represented by the formula:

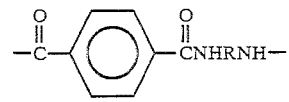

wherein R comprises at least one aliphatic $C_4$–$C_{14}$ hydrocarbyl radical, said polyphthalamide having a Tg greater than about 75° C. and a Tm greater than about 270° C.;

(b) from about 5 to about 25 wt % functionalized rubbery impact modifier;

(c) from about 5 to about 30 wt % polypropylene; and (d) from 0 to about 20 wt % of carboxyl-modified polyolefin.

2. The blend of claim 1 wherein said functionalized rubbery impact modifier is selected from the group consisting of functionalized polymers of ethylene and at least one $C_3$–$C_8$ higher alpha-olefin and functionalized block copolymers having blocks of polymerized vinylaromatic monomer units and polymeric rubber blocks comprising units of at least one of ethylene/propylene, ethylene/butylene and ethylene/pentylene.

3. The blend of claim 1 wherein the functionalized rubbery impact modifier is selected from the group consisting of maleated ethylene-propylene copolymer, maleated SEBS block polymer and maleated EPDM.

4. The blend of claim 1 wherein said polyphthalamide has a Tm in the range of from about 270° C. to about 350° C. and comprises from 40 to 100 mole % aliphatic diamine terephthalamide units represented by the formula:

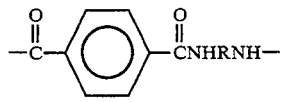

and from 0 to about 60 mole % aliphatic diamine adipamide units represented by the formula:

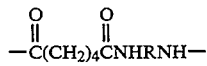

wherein R comprises at least one $C_4$–$C_{14}$ divalent aliphatic radical;

5. The blend of claim 4 wherein the polyphthalamide comprises from about 40 to 95 mole % said aliphatic diamine terephthalamide units, from about 5 to about 60 mole % aliphatic diamine adipamide units and from 0 to about 25 mole % aliphatic diamine isophthalamide units.

6. The blend of claim 4 wherein said R is $C_6$.

7. The blend of claim 1 wherein said polyphthalamide has a Tg in the range of from about 80° C. to about 130° C. and a Tm in the range of from about 290° C. to about 330° C.

8. The blend of claim 1 comprising polypropylene and carboxyl-modified polyolefin in a weight ratio of from about 3:1 to about 1:3.

9. A method for improving the rigidity of impact-modified polyphthalamide blends comprising (a) from about 45 to about 90 wt % polyphthalamide having a Tg greater than about 75° C. and a Tm greater than about 270° C. and containing aliphatic diamine terephthalamide units represented by the formula:

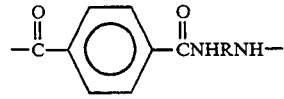

wherein R comprises at least one aliphatic $C_4$–$C_{14}$ hydrocarbyl radical; and (b) from about 5 to about 20 wt % functionalized rubbery impact modifier selected from the group consisting of maleated ethylene-propylene copolymer, maleated SEBS block polymer and maleated EPDM, said method comprising the step of compounding the polyphthalamide with said functionalized rubbery impact modifier and with from about 5 to about 30 wt % polypropylene and from 0 to about 20 wt % of carboxyl-modified polyolefin, based on total resinous components.

10. The method of claim 9 wherein said impact modified polyphthalamide is compounded with polypropylene and a carboxyl-modified polyolefin in a weight ratio of from about 3:1 to about 1:3.

* * * * *

UNITED STATES PATENT AND TRADEMARK OFFICE
CERTIFICATE OF CORRECTION

PATENT NO.: 5,436,294

DATED: July 25, 1995

INVENTOR(S): Glenn P. Desio, Ruth A. Montag, George A. Corbin

It is certified that error appears in the above-identified patent and that said Letters Patent is hereby corrected as shown below:

| Col. | Line | | |
|---|---|---|---|
| 4 | 48 | "polyphthalarnide" should read | --polyphthalamide-- |
| 5 | 14 | "comprising terephthalamide 0 and" should read | --comprising terephthalamide and-- |
| 8 | 34-35 | "polymerizod styrene" should read | --polymerized styrene-- |
| 9 | 19-20 | "styreneoethylene/butylene-styrene" should read | --styrene-ethylene/butylene-styrene-- |
| 11 | 17 | "carboxylic acid arthydride" should read | --carboxylic acid anhydride-- |
| 13 | 67-68 | "MFR value of 0.5 g/10 rain" should read | --MFR value of 0.5 g/10 min-- |
| 17 | 66-67 | "robbery impact modifier" should read | --rubbery impact modifier-- |
| 24 | 10 | "45 to about 90 wt % polyphthalamide" should read | --75 to about 90 wt % polyphthalamide-- |

Signed and Sealed this

Sixth Day of February, 1996

Attest:

BRUCE LEHMAN

Attesting Officer

Commissioner of Patents and Trademarks